Patented Oct. 15, 1935

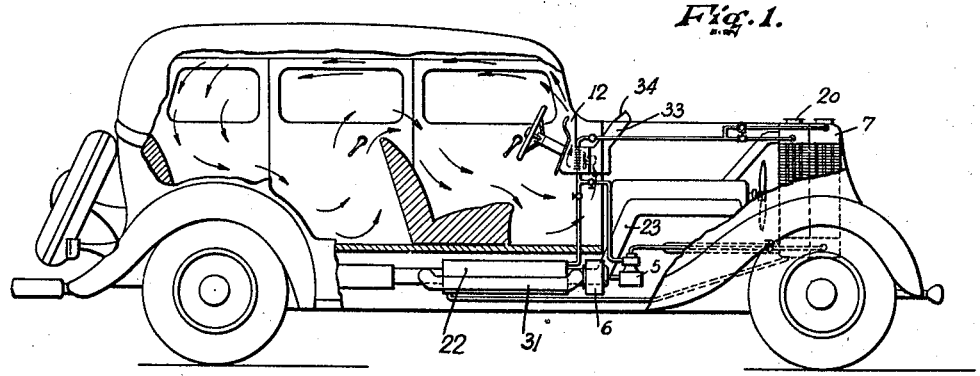
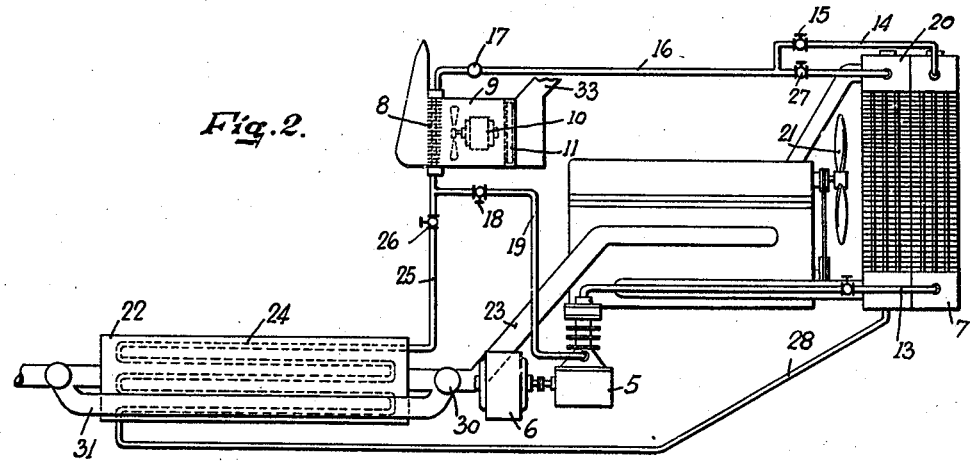
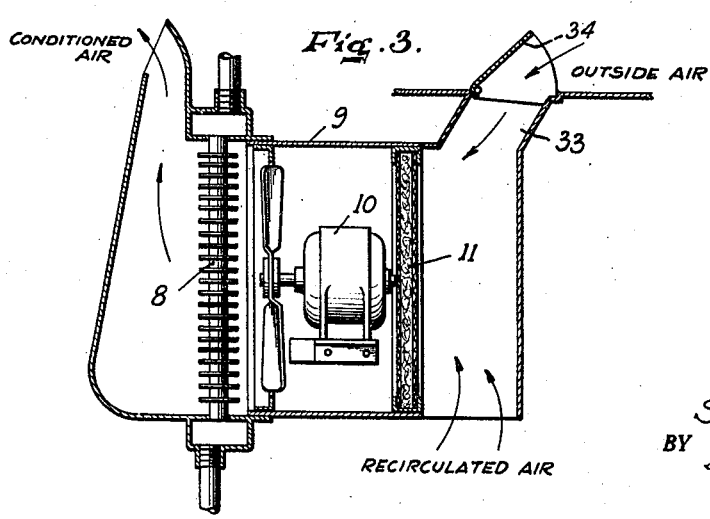

2,017,579

UNITED STATES PATENT OFFICE 2,017,579

AIR CONDITIONER FOR VEHICLES

Samuel M. Anderson, Sharon, Mass., assignor to B. F. Sturtevant Company, Inc., Hyde Park, Mass.

Application February 8, 1934, Serial No. 710,256

5 Claims. (Cl. 257—7)

This invention reates to the conditioning of air to be supplied to passengers in a moving vehicle, and relates in one particular to the conditioning of air supplied to the passengers in the automobile-type of vehicle.

While the advantages of supplying refrigerated air in summer for comfort purposes has been appreciated for some time, there has been no practical cooling system, suitable for use in the ordinary passenger automobile. The reasons for this are believed to be the difficulty of properly distributing cooled air without the use of undesirable distribution ducts and the high cost of producing the necessary refrigerating effect.

An object of this invention is to cool the air supplied in summer to passengers in an automobile.

Another object of the invention is to provide a combined heating and cooling system for a passenger automobile.

Another object of the invention is to provide an efficient refrigeration unit for supplying cold air to automobile passengers.

Another object of the invention is to distribute conditioned air within an automobile without the creation of drafts and without the modification of the interior of the automobile.

Other objects of the invention will be apparent from the following description taken together with the drawing.

Those refrigeration plants which have been proposed for supplying the necessary cooling effect for air conditioning automobiles have necessarily been too bulky and too expensive to operate because of the lack, which has heretofore existed, of the proper condenser facilities. According to this invention, a passenger automobile is supplied with a refrigerant condenser which is mounted in cooperation with the ordinary radiator so as to be a part thereof or a separate auxiliary radiator associated therewith. It is preferred that the condenser be a separate radiator and mounted as a second radiator in front of the ordinary radiator for cooling the engine jacket water, and it has been found that with this arrangement sufficient cooling effect is obtained for extracting the heat units from the compressed unit; that a compressor of small capacity, inexpensive to operate, may be used with an air cooling system, the evaporator coils of the refrigeration unit serving as the coils for cooling the air.

According to another feature of this invention, air is cooled by passage over cooling coils through which a refrigerant is circulated, and is discharged through an opening between the instrument board and windshield in an upward direction so that it travels overhead of the passenger space to the rear of the car and is deflected as warm air along the floor line, and is drawn again into the cooling unit and recirculated.

The invention will now be described with reference to the drawing, of which:

Fig. 1 is a side view, with a portion removed, of an automobile equipped with an air conditioning system according to this invention;

Fig. 2 is a more or less diagrammatic view of the arrangement of the refrigeration apparatus, and Fig. 3 is a side view, in section, of the air conditioning units of Figs. 1 and 2.

The refrigerant compressor 5 is driven by the electric motor 6, which is energized from the storage battery of the car. The auxiliary radiator 7 serves as the condenser of the refrigerating unit, and the extended surface coils 8 in the air conditioning unit 9 serve as expansion coils of the unit when cooling is desired. The motor driven fan 10, which is also energized from the car battery, serves to draw air from the interior of the car in through the filter 11, to pass it over the surfaces of the coils 8, several of which are disposed in parallel relationship, and to force the air, under pressure, through the opening 12, arranged to the rear of the instrument panel and between it and the windshield of the car.

When it is desired to supply cooled air into the car, the refrigerant compressor 5 is operated; the compressed refrigerant passes into the condenser 7 through the pipe 13, and passes from the condenser through pipe 14, valve 15, pipe 16, expansion valve 17, coils 8, valve 18, pipe 19, and back into the compressor. The heat units of the compressed refrigerant are given off by the condenser 7 to the air passing the automobile, which is normally in motion. The cooled refrigerant expands through the expansion valve 17, the coils 8, and in expansion extracts heat from the air in contact with the coils. The fan 10 passes air continually over the coils 8, where it is cooled, and discharges the cooled air into the car, as shown by the arrows of Fig. 1. The condenser 7 may be a radiator exactly similar to the regular automobile radiator 20, and it is preferably placed, as illustrated, in front of the regular automobile radiator, in order that it may receive the coolest air when the car is in motion. The ordinary fan 21 serves to draw air in through both radiators.

Since this invention also contemplates the winter conditioning of air with the minimum of apparatus, provision is made for supplying steam to the extended surface coils 8 in the air conditioning system, which coils then serve for heating the air supplied within the car. In order to accomplish this, a boiler 22 is inserted in the exhaust line 23 of the engine, and this boiler contains the steam coils 24 in which steam is generated by the heat in the exhaust gases, which steam passes through the pipe 25, valve 26, coils 8, pipe 16, valve 27, and radiator 20, which serves in this case to condense the steam. The pipe 28 serves to supply a small amount of water, which is converted in the boiler 22 into steam, from the radiator 20.

To adapt the system for summer operation, valves 26 and 27 are closed and valves 15 and 18 opened, and, of course, the motor 6 is energized from the car battery. The valve 30 in the exhaust line is operated to by-pass the exhaust gases through the by-pass pipe 31 and around the boiler 22.

To convert the system to winter operation, the valves 18 and 15 are closed, the valves 30, 26 and 27 are opened, and the electrical circuit to motor 6 is disconnected.

By providing that the conditioned air be discharged into an opening between the windshield and the instrument board of the car, it has been found that adequate air circulation and distribution, without draft, is obtained. The distribution of cold air presents many more problems than that of heated air. It has been found that this arrangement takes care of those problems, since the cold air is drawn upwardly against the roof of the car, which deflects it so that it passes overhead the passenger space to the rear of the car, where it is deflected downwardly. In passing over the front seats, a small amount of the cold air filters down by gravity into the area occupied by the front seat passengers, and no drafts are produced in the area of the front seats. The system is so adjusted that by the time the cold air reaches the rear of the car, to be deflected downwardly as shown by Fig. 1, the cold air has been warmed by contact with warmer air in the car to a point where it is not chilly, and thus does not produce drafts in the area of the rear seats. The air, after passing the rear seats, is deflected over the floor line and up and over the backs of the front seats, and this warmer air mixing with the cooler air, which has filtered down from the cold air passing over the front seats, supplies the necessary cooling effect to the front seat passengers.

Sufficient outside air for maintaining a freshness of the air supplied to the passengers is indrawn into the unit 9 through the opening 33, communicating with the hood ventilators 34. The car may thus be operated with all the windows and windshield closed, and any dusty outside air is filtered by the filter 35 prior to discharge into the car. With this arrangement, filtered outside and recirculated air is mixed, conditioned, and discharged into the passenger space.

It is preferred that the conditioning unit 9 be mounted in that space available beneath and to the rear of the instrument board, in which place it is insulated from the heat of the engine by the insulating bulkhead now used in modern passenger automobiles.

Whereas one embodiment of the invention has been described for the purpose of illustration, it should be understood that the invention is not limited to the details described, since many modifications may be practiced by those skilled in the art without departing from the spirit of the invention.

What is claimed is:

1. An air conditioning system for an automobile operated by an internal combustion engine and equipped with a radiator for cooling the jacket water of the engine, comprising a second radiator mounted adjacent said radiator, a refrigerant compressor, an electric motor energized from the automobile storage battery for driving said compressor, a pipe conducting the compressed refrigerant to said second radiator which serves as a condenser, an air conditioning unit, coils in said unit, another pipe conducting the refrigerant from said second radiator to said coils which act as evaporator coils, a third pipe for conducting the refrigerant from said coils back to said compressor, heating means energized by the exhaust of said engine for heating a fluid supplied from said radiator, means for circulating the heating fluid through said coils and back to said heating means, means operable at will for deenergizing the compressor and discontinuing the supply of refrigerant to said coils and for supplying a heating medium from said heating means to said coils, and means for passing the air over said coils and discharging it into the passenger space in said automobile.

2. An air conditioning system for a passenger automobile, comprising an air conditioning unit mounted below and to the rear of the instrument panel, a heat exchange coil in said unit, a fan in said unit for passing air over said coil and discharging it to the passenger space, a discharge outlet from said unit arranged between said instrument panel and the windshield of said automobile, and means for supplying heating or cooling effects, at will, to said unit.

3. An air conditioning system for a passenger automobile, comprising an air conditioning unit mounted below and to the rear of the instrument panel, a heat exchange coil in said unit, a fan in said unit for passing air over said coil and discharging it to the passenger space, a discharge outlet from said unit arranged between said instrument panel and the windshield of said automobile, a hood ventilator, and means for taking outside air through said ventilator and passing it to said unit.

4. An air conditioning system for a passenger automobile, comprising an air conditioning unit mounted below and to the rear of the instrument panel, a heat exchange coil in said unit, a fan in said unit for passing air over said coil and discharging it to the passenger space, a discharge outlet from said unit arranged between said instrument panel and the windshield of said automobile, a hood ventilator, means for taking outside air through said ventilator and passing it to said unit, and means for filtering air taken into said unit.

5. An air conditioning system for a passenger automobile, comprising an air conditioning unit mounted below and to the rear of the instrument panel, a heat exchange coil in said unit, means for supplying heating or cooling effects at will to said coil, means for indrawing and filtering outside air connecting with said unit, a recirculated air inlet connecting with said unit and opening into the space beneath the instrument panel, a fan in said unit for indrawing outside and recirculated air and for passing same over said coil and for discharging it into the passenger space, and a discharge outlet in said unit arranged to discharge conditioned air towards the rear of said car and overhead the passenger space.

SAMUEL M. ANDERSON.